United States Patent [19]
Timmler et al.

[11] 3,821,394
[45] June 28, 1974

[54] ANTIMYCOTIC COMPOSITION AND METHOD EMPLOYING A SUBSTITUTED BENZYL-AZOLES

[76] Inventors: Helmut Timmler; Wilfried Draber; Karl Heinz Büchel; Manfred Plempel, all of Wuppertal-Elberfeld, Germany

[22] Filed: Dec. 22, 1972

[21] Appl. No.: 317,835

Related U.S. Application Data
[62] Division of Ser. No. 165,321, July 22, 1971.

[30] Foreign Application Priority Data
July 29, 1970  Germany............................ 2037610

[52] U.S. Cl. .............................................. 424/273
[51] Int. Cl............................................. A61k 27/00
[58] Field of Search .................................. 424/273

[56] References Cited
UNITED STATES PATENTS

| | | | |
|---|---|---|---|
| 3,236,856 | 2/1965 | Pavenell.............................. | 260/309 |
| 3,468,902 | 9/1969 | Beaman et al. ..................... | 260/309 |
| 3,575,999 | 4/1971 | Godefroi et al..................... | 260/309 |
| 3,658,813 | 4/1972 | Godefroi et al..................... | 260/309 |

OTHER PUBLICATIONS
Chemical Abstracts 56: Col. 14233–4 (1962).
Chemical Abstracts 64: Col. 9759–60 (1966).
Chemical Abstracts 65: Col. 12207–10 (1966).

*Primary Examiner*—Jerome D. Goldberg

[57] ABSTRACT

1-Benzylimidazoles and 1-benzyl-1,2,4-triazoles bearing both an alkyl, phenyl or cycloalkyl group and a formyl, alkanoyl, aroyl or cycloalkylcarbonyl group on the α-carbon atom of the benzyl group, as well as the ketals, acetals, oximes and semicarbazones thereof, are antimycotic agents. They are prepared by treating the corresponding α-halobenzyl compounds with imidazole or 1,2,4-triazole or the corresponding α-hydroxybenzyl compounds with the appropriate thionyl bisazole. A typical embodiment is the preparation of diphenyl-acetyl-imidazol-1-yl-methane from 1-bromo-1,1-diphenyl-2-propanone and imidazole.

21 Claims, No Drawings

3,821,394

ANTIMYCOTIC COMPOSITION AND METHOD EMPLOYING A SUBSTITUTED BENZYL-AZOLES

This is a division of application Ser. No. 165,321 filed July 22, 1971.

DETAILED DESCRIPTION

The present invention relates to new α-substituted benzyl-azoles, to processes for their production, and to their use as medicines, especially as antimycotic agents.

The invention pertains to new compounds of the formula:

$$\begin{array}{c} A-C-\text{Azole} \\ Y-C-X \\ B \end{array} \quad (1)$$

wherein

A is phenyl or substituted phenyl, alkyl or cycloalkyl;

B is hydrogen, lower alkyl, cycloalkyl or optionally substituted aryl;

"Azole" is imidazol-1-yl or 1,2,4-triazol-1-yl; and

X and Y when taken independently are each an identical or different lower alkoxy; or:

X and Y when taken together are oxygen or $$-\overset{|}{\text{N}}\text{H}, \ -\overset{|}{\text{N}}\text{OH},$$

or $$-\overset{|}{\text{N}}-\text{NH-CO-NH}_2,$$

and the salts thereof.

These compounds and their pharmaceutically acceptable salts possess an excellent chemotherapeutic activity, in particular antimycotic action.

By the term lower alkyl is intended a branched or straight saturated hydrocarbon group of from one to four carbon atoms such as methyl, ethyl, propyl, isopropyl, butyl, sec.butyl, isobutyl and tert.butyl. The term lower alkoxy refers to similar groups bound through an oxygen ether linkage.

Methyl and methoxy are particularly preferred. Cycloalkyl groups embraced by A and B contain three to six carbon atoms, preferably five or six, such as cyclopropyl, cyclobutyl, cyclopentyl and cyclohexyl. The aryl group embraced by B preferably contains six or 10 carbon atoms, especially six, phenyl being particularly important.

The phenyl radical A and the aryl radical B can carry one or more identical or different substituents. As substituents, there may be mentioned halogen (F, Cl, Br and I), preferably fluorine, chlorine or bromine; lower alkyl, lower alkoxy and lower alkylthio, for example, methoxy, ethoxy, propoxy, butoxy, methylthio, ethylthio, propylthio and butylthio.

These α-substituted benzyl-azoles can be used either in the form of their free bases or in the form of their pharmaceutically acceptable salts with inorganic or organic acids. Examples of suitable inorganic acids include the hydrogen halide acids, as for example, hydrochloric acid and hydrobromic acid, phosphoric acids, sulphonic acids, monocarboxylic and dicarboxylic acids and hydroxycarboxylic acids. Organic acids include acetic acid, tartaric acid, lactic acid, malic acid, citric acid, salicylic acid, sorbic acid, and the like. Hydrochloric acid is particularly preferred.

A preferred group of compounds and salts of the invention are those wherein,

A is lower alkyl, phenyl, fluorophenyl, chlorophenyl or methylphenyl,

B is hydrogen, lower alkyl or phenyl,

Azole is imidazol-1-yl,

X and Y taken independently are each lower alkoxy or

X and Y taken together are oxygen.

A preferred subgroup within this class are those compounds in which,

A is methyl, phenyl, fluorophenyl, chlorophenyl, or methylphenyl;

B is hydrogen, methyl or phenyl;

Azole is imidazol-1-yl;

X and Y taken independently are each methoxy; or

Y and Y together are oxygen.

The invention also provides novel processes for the production of these new α-substituted benzylazoles and their salts.

A first embodiment of the process of the present invention comprises reacting an α-substituted benzyl halide of the formula:

$$\begin{array}{c} A-C-\text{Hal} \\ Y-C-X \\ B \end{array} \quad (2)$$

in which A, B, X and Y are as defined above and "Hal" is a halogen atom, preferably bromine or chlorine, with imidazole or 1,2,4-triazole, and, when desired, converting the product to a pharmaceutically acceptable salt.

If, for example, diphenylbromomethyl methyl ketone and imidazole are used as starting compounds, the course of the reaction can be represented as follows:

$$(3) \quad \text{Ph}_2\text{C(Br)}-\text{CO}-\text{CH}_3 + \text{imidazole} \xrightarrow{-\text{HBr}} \text{Ph}_2\text{C(Im)}-\text{CO}-\text{CH}_3 \quad (4)$$

The reaction of the α-substituted benzyl halide of Formula (2) with imidazole or 1,2,4-triazole can be carried out either in the presence or in the absence of a diluent. Polar organic solvents such as acetonitrile, nitromethane, dimethylformamide and hexamethylphosphoric acid triamide are generally suitable as diluents. The reaction is preferably carried out in the presence of an excess of an acid-binding agent, but at least in the presence of approximately the stoichiometrically required amount thereof. An excess of the imidazole or triazole employed can be used as the acid-binding agent but any acid-binding agent can be employed. These include the alkali metal and alkaline earth metal hydroxides as, for example, sodium, potassium or calcium hydroxides; alkali metal alcoholates as, for example, sodium methylate or sodium ethylate; alkali metal carbonates as, for example, potassium carbonate; and organic bases as, for example, triethylamine or quinoline. The reaction temperatures can be varied over a substantial range. In general, the process is carried out at from about 20° to about 100°C, preferably from about 50° to about 85°C. One to 2 mols of the heterocyclic compound (imidazole or triazole) are preferably employed per mol of the α-substituted benzyl halide (2). If a separate acid-binding agent is not employed, two to four mols of imidazole or triazole should be present.

The second embodiment of the present invention comprises reacting a carbinol of the general formula:

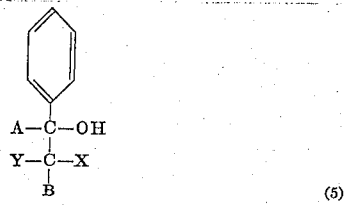

(5)

in which A, B, Y and X are as defined above with a thionylbisazole of the general formula:

(6)

in which "Azole" is as defined above to produce a compound of the invention; and when a salt is desired, converting the product into a pharmaceutically acceptable salt.

If, for example, 2-phenylacetoin and thionyl-bis-imidazole are used as starting compounds, the course of the reaction can be represented as follows:

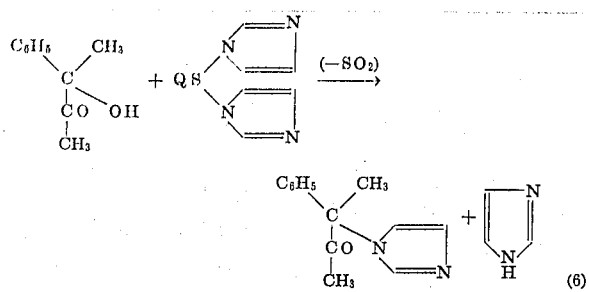

(6)

The reaction of the carbinols (5) with the thionyl-bis-azole (6) is preferably carried out in the presence of a diluent. Polar organic solvents such as, for example, acetonitrile, nitromethane and dimethylformamide are generally suitable as diluents. The reaction temperature again can be varied over a substantial range, but is preferably from about 20° to about 100°C, generally from about 50° to about 85°C. The starting compounds are preferably employed in molar amounts. The reaction products of either process can be isolated from the reaction mixture according to conventional techniques. The products are solid, crystalline compounds.

Compounds of the invention in which X and Y together are an oxygen atom (i.e., the ketones and aldehydes) can be converted into compounds of the invention in which X and Y together are an =NOH group; i.e., the oximes, through treatment with hydroxylamine. The compounds of the invention in which X and Y together are an =N·NH₂·CO·NH₂ group; i.e., the semicarbazones, are obtained through treatment with a semicarbazide. These reactions are carried out according to the usual techniques.

The starting materials are known or can be prepared according to known methods; e.g., J. Org. Chem. 19, (1954), 538.

The conversion of compounds of the invention into their salts and vice versa is performed according to the usual techniques, e.g., treatment with an acid or base, respectively.

The following examples will serve to further illustrate the nature of the invention.

EXAMPLE 1:

Diphenyl-acetyl-imidazol-1-yl-methane

A solution of 22 g of 1-bromo-1,1-diphenyl-2-propanone in 100 ml of acetonitrile is added dropwise to a boiling solution of 30 g of imidazole in 250 ml of acetonitrile, with stirring. After boiling overnight, the acetonitrile is evaporated off and the residue is triturated with water and taken up in ethyl acetate. The organic phase is washed with water and dried, and the solvent is evaporated. The residue left is 10 g of the compound of the formula:

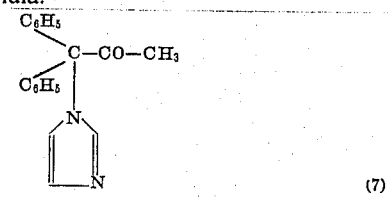

(7)

of melting point 98°C; after recrystallization from ligroin/ethyl acetate, 103°C.

The following bromoketones are allowed to react with imidazole according to the procedure of Example 1

| Example No. | Bromoketone |
|---|---|
| 2 | 1-bromo-1,1-diphenylacetophenone |
| 3 | 1-bromo-1-(p-chlorophenyl)-1-phenylacetophenone |
| 4 | 1-bromo-1-(p-fluorophenyl-1-phenylacetophenone |
| 5 | 1-bromo-1-m-tolyl-1-phenylacetophenone |

There are thus obtained the following compounds:

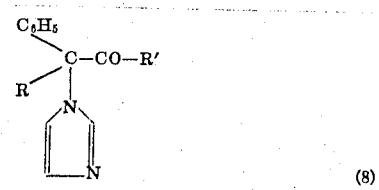

(8)

| Example No. | R | R' | Melting point |
|---|---|---|---|
| 2 | C₆H₅ | C₆H₅ | 126°C |
| 3 | p—Cl—C₆H₄ | C₆H₅ | 136°C |
| 4 | p—F—C₆H₄ | C₆H₅ | 176°C |
| 5 | m—CH₃—C₆H₄ | C₆H₅ | (Hydrochloride) 120°C |

EXAMPLE 6:

Diphenyl-dimethoxymethyl-imidazol-1-yl-methane hydrochloride 25.8 g (0.1 mol) of diphenyl-dimethoxy-methyl carbinol are dissolved in 200 ml of absolute acetonitrile and mixed, at room temperature, with a freshly prepared solution of 0.13 mol of thionyl-bis-imidazole in acetonitrile. The mixture is allowed to stand for 1 hour and is then heated at boiling for 15 minutes. It is then concentrated in vacuo, and the residue is treated with water and taken up in ether. The ether solution is extracted by shaking three times with water, and is dried with sodium sulfate. It is then filtered and dry hydrogen chloride is passed through until the mixture is saturated. The yellowish precipitate is filtered off, washed with water and dried. 21.5 (62 percent of theory) of the compound of the formula:

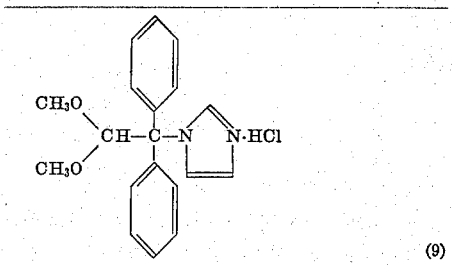

(9)

of melting point 200° – 203°C are obtained.

The diphenyl-dimethoxymethyl-carbinol employed as the starting compound is obtained in the following manner: A solution of 0.5 mol of phenylmagnesium bromide in ether is added dropwise, with stirring, to a solution of 26.8 g (0.2 mol) of dimethoxyacetic acid methyl ester in 150 ml of absolute ether. The reaction is strongly exothermic. After dropwise addition of about half of the Grignard compound, 200 ml of tetrahydrofuran are added to facilitate stirring. After completion of the dropwise addition, the mixture is boiled for a further 10 minutes and is then decomposed with ice water and ammonium chloride solution. The organic phase is separated, the aqueous phase is extracted once with ether, and the combined organic phases are subsequently extracted once with ammonium chloride solution and then twice with sodium chloride solution. After drying and evaporation of the solvent, there are obtained 48 g (93 percent of theory) of the carbinol of the formula:

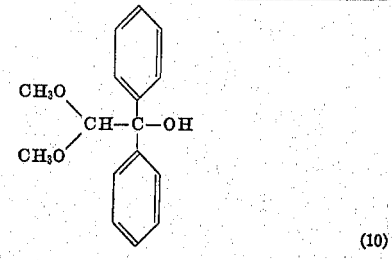

(10)

as a light yellow, viscous oil.

EXAMPLE 7:

Methyl-phenyl-acetyl-imidazol-1-yl-methane 16.4 g of phenylacetoin are dissolved in 200 ml of acetonitrile and treated, at room temperature, with a freshly prepared solution of 0.13 mol of thionyl-bis-imidazole in acetonitrile. The mixture is allowed to stand overnight and is then heated at boiling for 30 minutes. It is then concentrated in vacuo, and the residue is treated with water and taken up in ether. The ether solution is repeatedly washed with water and is then dried with sodium sulfate. Hydrogen chloride is then passed into the ether solution. 20 g (79 percent of theory) of the compound of the formula:

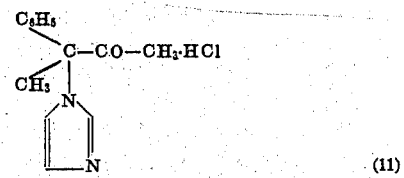

(11)

of melting point 202°C precipitate and are isolated through filtration and drying.

As already mentioned, the new compounds of formula (1) and their pharmaceutically acceptable salts can be employed as medicines, especially for combatting mycoses, in human medicine and in veterinary medicine.

The activity of the compounds of the general Formula (1) and their pharmaceutically acceptable salts can be conveniently observed in in vitro and in vivo experiments. The compounds show a good and broad antimycotic action in vitro, for example, against varieties of Trichophyton; varieties of Microsporon; *Candida albicans; Histoplasma capsulatum; Cryptococcus neoformans;* varieties of *Aspergillus;* varieties of *Penicillium* and *Saprolegnia parasitica*, and varieties of *Blastomyces* and *Coccidioides immitis.*

In vitro tests were thus carried out for Dermatophytes and filamentous fungi on Sabouraud's test medium, in series dilution tests and agar diffusion tests, and for yeasts and gemmiparous fungi on meat bouillon-glucose broth in the series dilution test. The incubation temperature was 28°C and the incubation time was 24 – 96 hours, with daily observation.

Table 1 summarises the minimal inhibitor concentrations, in γ/ml, of five preparations, against some specified fungi. The figures in round brackets ( ) indicate the number of strains tested.

Table 1

| Example No. | Trichophyton (10) | Microsporen canis (9) | Candida albicans (15) | Cryptococcus neoformans (5) | Histoplasma capsulatum (3) | Aspergillus (3) | Penicillium (3) | Saprolegnia parasitica (2) |
|---|---|---|---|---|---|---|---|---|
| 1 | <4 | 10 | 10 | 10 | 10 | 10 | 20 | — |
| 2 | <4 | <4 | 4 | 10 | 1 | <4 | 4 | — |
| 6 | <1 | 4 | 10 | 4 | 1 | 4 | 10 | 20 |
| 3 | <1 | 4 | 1 | 4 | 1 | 4 | <1 | <1 |
| 4 | <1 | <1 | 1 | 1 | 1 | <1 | 1 | 1 |

Minimal Inhibitory Concentrations in γ/ml of Substrate at

The antimycotic type of action is fungistatic at up to 20 γ/ml, and partially fungicidal in concentrations of >20 γ/ml, with a reduction in the inoculum by about 90 percent in 96 hours.

A surprising feature is the broad activity of the preparations against human-pathogenic and animal-pathogenic fungi, which extends both to filamentous fungi —*Dermatophytes*, *Aspergilli* and the like — and to yeasts and *gemmiparous fungi*, while all antimycotics hitherto commercially available are, at physiologically acceptable concentrations, either only effective against filamentous fungi or only effective against yeasts and gemmiparous fungi.

Antimycotic actions are also observed in vivo, as is apparent from the following.

1. Experimental condidosis of white mice caused by *Candida albicans*.

Male $CF_1$-SPF mice, weighing 20 – 22g, are infected by intravenous injections of $2 \times 10^6$ Candida cells of a 24 hour old culture of *Candida albicans*. In the case of untreated control animals, the infection, through multiple abscess formation in the kidneys, leads to uraemia and causes death 4 – 5 days after infection. The survival rates of the animals treated orally with the preparations mentioned, using a dose of 100 mg of preparation/kg of body weight twice on the day of infection, are summarized in Table 2.

Table 2

| Example No. | Number of Surviving Animals on 6th. day after Infection |
|---|---|
| 1 | 18 out of 20 |
| 2 | 12 out of 20 |
| 6 | 14 out of 20 |
| 3 | 14 out of 20 |
| 4 | 16 out of 20 |
| Control group | 2 out of 10 |

2. Experimental Quinckeanum Trichophytosis of white mice

Male $CF_1$-SPF mice, weighing 20 – 22 g are infected, on the shorn back, with a spore suspension of *Trichophyton Quinckeanum* by rubbing in the spores. After the end of 8 – 10 days, a typical dermatomycosis with scutula formation develops in the untreated control animals.

If infected mice are given $2 \times 50$ mg of preparation/kg of body weight orally by means of a gavage daily, starting from the day of infection, up to the tenth day after infection, the development of the infection can be entirely suppressed by treatment with the compounds obtained in Examples 1 and 4, that is to say 0 out of 20 animals show scutula, and in the case of treatment with the preparations obtainable according to the remaining examples, 2 – 4 out of 20 animals show isolated scutula, while in the case of the control animals, 18 out of 20 show multiple scutula formation.

3. Local use, employing the model of experimental guinea pig Trichophytosis by *Trichophyton mentagrophytes*.

Male Pearl-bright white guinea pigs weighing 450 – 600 g, and bred by Farbenfabriken Bayer A.G., are infected with a spore suspension of *Trichophyton mentagrophytes* on the shown, non-scarified back. In the case of the untreated control animals, the typical dermatomycosis, with loss of hair, reddening of skin and bleeding ulcerations develops within 24 – 30 days.

The new preparations are applied in the area of infection as a 1 percent strength solution in polyethylene glycol 400, once daily, starting on the fourth day after infection and continuing to the fifteenth day after infection, and are slightly rubbed in.

It was possible completely to suppress the development of the infection by means of the treatment with the preparation obtainable according to Example 1. The other preparations led to a light course of the infection, which began to heal from the twelfth day after infection onwards.

No skin-irritant action was observable.

As is apparent from the above, the compounds are well absorbed orally. The pharmacokinetics of the compound of Example 1 are as follows.

After oral administration of a single dose of 100 mg/kg of body weight to mice, peak serum concentrations of 6 – 8 γ/ml of serum are observed 3 to 4 hours after administration. The resorption ratio on oral administration can be estimated at 70 percent of the dose. In the urine of the animals, the preparation is excreted in a metabolized and microbiologically inactive form. The urine excretion is 20 percent of the dose (of metabolites) in 24 hours. 70 percent of the dose is excreted in a metabolized form with the faeces in 24 hours. The excretion with the faeces takes place after resorption of the preparation by the bile.

The present invention thus also provides antimycotic pharmaceutical compositions containing as an active ingredient at least one of the α-substituted benzylazoles of formula (1) or a pharmaceutically acceptable salt thereof, in admixture with a pharmaceutically acceptable solid or liquid diluent or carrier as hereinafter defined.

In the present specification the expression "pharmaceutically acceptable diluent or carrier" means a non-toxic substance that when mixed with the active ingredient or ingredients renders it suitable for administration. Other ingredients such as salts in correct quantities to render the composition isotonic, buffers, surfactants, coloring and flavoring agents, and preservatives can also be present. Examples of solid, liquid, and semi-solid diluents and carriers include water, non-toxic organic solvents, such as paraffins or petroleum fractions; vegetable oils such as groundnut oil/sesame oil; alcohols such as ethyl alcohol or glycerol; glycols such as propylene glycol or polyethylene glycol; natural rock powders such as kaolins, aluminas, talc or chalk; synthetic rock powders such as highly disperse silica and silicates; and sugars, for example, unrefined sugar, lactose and glucose. Examples of pharmaceutical compositions include ointments, pastes, creams, sprays, lotions, aqueous suspensions, elixirs, syrups, granules and powders, either free-flowing or compressed into tablets. A preferred group of pharmaceutical compositions are those adapted for oral administration. The diluents and carriers used are preferably therefore those that adapt the active ingredient or ingredients for oral administration. Examples of such diluents and carriers are solid vehicles, excipients and lubricants such as glucose, lactose and sucrose, corn and potato starch, sodium carboxymethyl cellulose, ethyl cellulose and cellulose acetate, powdered gum tragacanth, gelatin, alginic acid, agar, stearic acid, sodium, calcium and magnesium stearates, sodium lauryl sulfate, polyvinylpyrrolidone, sodium citrate, calcium carbonate, and dicalcium phosphate.

The pharmaceutical compositions of the invention can also contain other non-toxic adjuvants and modifiers such as dyes, surfactants, emulsifiers, such as non-ionic and anionic emulsifiers as, for example, polyoxyethylene-fatty acid esters, polyoxyethylene-fatty, alcohol ethers, alkylsulphonates and arylsulphonates, or dispersing agents as, for example, lignin, sulfite waste lyes, methylcellulose, starch and polyvinyl-pyrrolidone, perfumes, flaboring agents, preservatives and biocides.

The compounds and pharmaceutically acceptable salts of the invention may also be administered parenterally. A further group of pharmaceutical compositions of the invention are therefore those adapted for parenteral injection. The diluents and carriers used are those that adapt the active ingredient for parenteral administration. Examples of such diluents and carriers are solvents and suspending diluents such as water and water-miscible organic solvents, in particular sesame oil, groundnut oil, aqueous propylene glycol, and N,N'-dimethylformamide. Examples of pharmaceutical compositions of the invention are sterile isotonic saline aqueous solutions of the active ingredient, which may be buffered with a pharmaceutically acceptable buffer and are preferably pyrogen-free.

The new compounds and their pharmaceutically acceptable salts can also be administered topically. This can be done using a pharmaceutical composition adapted for local administration. Such a pharmaceutical composition is, for example, a 1 wt. percent solution of the active compound or salt in polyethylene glycol 400.

The pharmaceutical compositions of the invention preferably contain 0.5 to 90 wt. percent of a compound of the invention or a non-toxic salt thereof.

In general it has proved advantageous to administer amounts of about 60 mg to 180 mg/kg of body weight per day, divided among several administrations (for example, 20 to 60 mg/kg of body weight, t.i.d.), in order to achieve effective results. Nevertheless it may at times be necessary to depart from the amounts mentioned, and in particular to do so as a function of the body weight of the test animal, the route of administration, the animal and its individual behavior towards the medicine, the type of its formulation, and/or the time or interval of administration. Thus it will in some cases suffice to use less than the above mentioned minimum amount, while in other cases the upper limit mentioned must be exceeded. The same dosage range is envisaged for administration in human medicine and in veterinary medicine.

The present invention also provides medicaments in dosage unit form as hereinafter defined comprising as an active ingredient at least α-substituted benzyl-azole or Formula (1) or a pharmaceutically acceptable salt thereof, either alone or in admixture with a pharmaceutically acceptable solid or liquid diluent or carrier.

The expression "medicament in dosage unit form" as used herein refers to the compound in the form of discrete portions each containing a unit dose or a multiple or submultiple of a unit dose of the active ingredient(s); for example, one, two, three or four unit doses or a half, a third or a quarter of a unit dose. A "unit dose" is the amount of the active ingredient to be administered on one occasion and will usually be a daily dose, or a half, a third, or a quarter of a daily dose depending on whether the medicament is to be administered once or, for example, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragees; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

As stated above, it is preferred to administer the new α-substituted benzyl-azoles of Formula (1) or their salts perorally. Preferred medicaments in dosage unit form according to the invention are therefore those adapted for oral administration, such as tablets, pills, dragees, capsules, and cachets, as well as wrapped powders containing the active ingredient in powdered form with a powdered diluent or carrier for suspension in water before being taken.

As stated above it is also possible to administer the compounds and their pharmaceutically acceptable salts parenterally. Another group of medicaments in dosage unit form according to the invention are therefore those adapted for parenteral injection, such as ampoules containing a measured quantity of a sterile isotonic saline injectable aqueous solution of the new active ingredient, which may be buffered with a pharmaceutically acceptable buffer and are preferably free of pyrogens.

The preferred unit dose for administration of the medicaments of the invention is 1,000 – 5,400 mg. of active ingredient. This will normally be administered three times daily, but as explained above this frequency may be varied.

The invention further provides a method of combatting mycotic infection in an animal which comprises administering to the animal (preferably parenterally, perorally or topically), a pharmaceutical composition, or a medicament in dosage unit form according to the invention.

What is claimed is:

1. An antimycotic composition comprising a pharmaceutical carrier and an antimycotically effective amount of a compound of the formula:

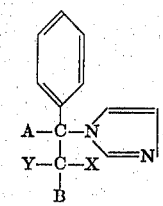

wherein A is lower alkyl, phenyl, halophenyl or lower alkylphenyl:

B is hydrogen, lower alkyl or phenyl; and

X and Y, when taken independently, are each lower alkoxy, or

X and Y, when taken together, are O, NOH or NNHCONH₂, or a pharmaceutically acceptable acid addition salt thereof.

2. A composition according to claim 1 in oral administration form.

3. A composition according to claim 1 in parenteral administration form.

4. A composition according to claim 1 in topical administration form.

5. A composition according to claim 1 wherein
A is lower alkyl, phenyl, fluorophenyl, chlorophenyl, or methylphenyl;
B is hydrogen, lower alkyl or phenyl and
X and Y taken independently are lower alkoxy or
X and Y taken together are oxygen,
or a pharmaceutically acceptable acid addition salt thereof.

6. A composition according to claim 5 wherein said compound has the formula:

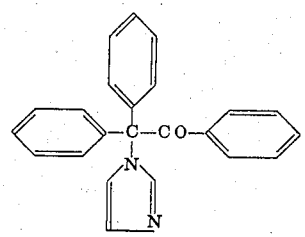

7. A composition according to claim 5 wherein said compound has the formula:

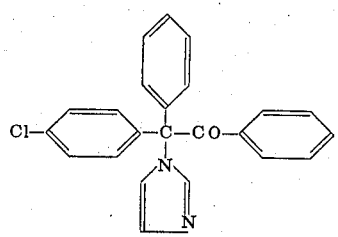

8. A composition according to claim 5 wherein said compound has the formula:

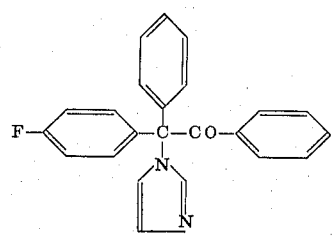

9. A composition according to claim 5 wherein said compound has the formula:

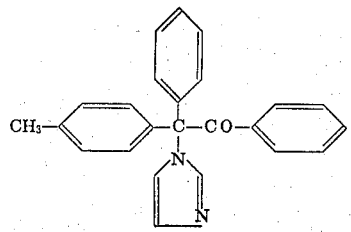

10. A composition according to claim 5 wherein said compound has the formula:

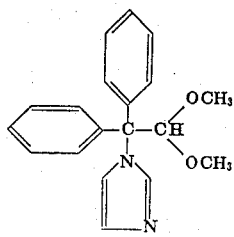

11. A composition according to claim 5 wherein said compound has the formula:

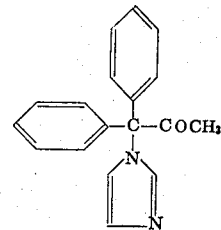

12. A composition according to claim 5 wherein said compound has the formula:

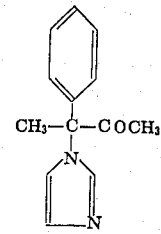

13. The method of combatting a mycotic infection in a human or animal which comprises administering to said animal an antimycotically effective amount of a compound of the formula:

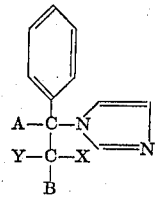

wherein A is lower alkyl, phenyl, halophenyl or lower alkylphenyl;
B is hydrogen, lower alkyl or phenyl; and
X and Y, when taken independently, are each lower alkoxy,
or
X and Y, when taken together, are O, NOH or NNHCONH₂,
or a pharmaceutically acceptable acid addition salt thereof.

14. The method according to claim 13 wherein said antimycotically effective amount is from 60 to 180 mg/kg per day and further wherein in said compound A is lower alkyl, phenyl, fluorophenyl, chlorophenyl, or methylphenyl;
B is hydrogen, lower alkyl or phenyl and
X and Y taken independently are lower alkoxy or
X and Y taken together are oxygen,
or a pharmaceutically acceptable acid addition salt thereof.

15. The method according to claim 14 wherein said compound has the formula:

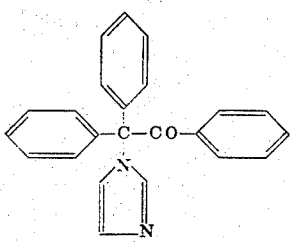

16. The method according to claim 14 wherein said compound has the formula:

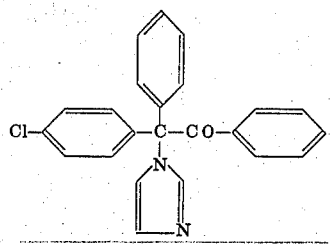

17. The method according to claim 14 wherein said compound has the formula:

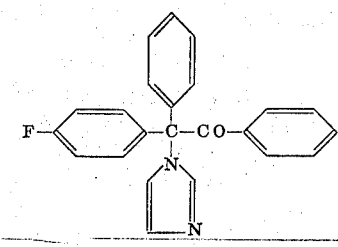

18. The method according to claim 14 wherein said compound has the formula:

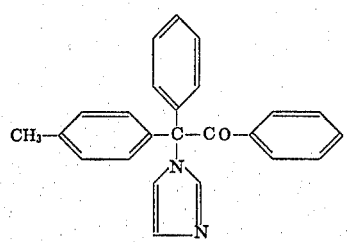

19. The method according to claim 14 wherein said compound has the formula:

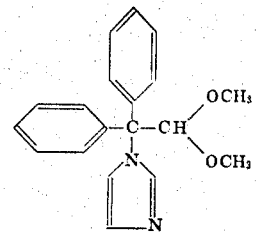

20. The method according to claim 14 wherein said compound has the formula:

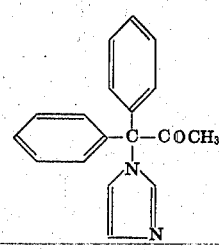

21. The method according to claim 14 wherein said compound has the formula:

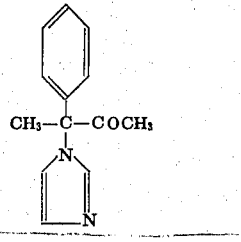

* * * * *